(12) United States Patent
Sampson et al.

(10) Patent No.: US 7,747,602 B2
(45) Date of Patent: Jun. 29, 2010

(54) COMMENT FACES

(75) Inventors: Todd Sampson, Orlando, FL (US); John Sampson, Orlando, FL (US); Steve Ho, Apopka, FL (US); Eric Marcoullier, San Francisco, CA (US); Neil Scott Rafer, San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 320 days.

(21) Appl. No.: 11/831,770

(22) Filed: Jul. 31, 2007
(Under 37 CFR 1.47)

(65) Prior Publication Data
US 2009/0037454 A1   Feb. 5, 2009

(51) Int. Cl.
*G06F 7/00*   (2006.01)
(52) U.S. Cl. ...................................... 707/708
(58) Field of Classification Search ............ 707/3, 707/708
See application file for complete search history.

(56) References Cited
U.S. PATENT DOCUMENTS

| 2004/0034573 | A1  | 2/2004 | Cohen |
| 2006/0173985 | A1* | 8/2006 | Moore .......................... 709/223 |
| 2007/0118794 | A1* | 5/2007 | Hollander et al. ........... 715/512 |
| 2008/0195712 | A1* | 8/2008 | Lin et al. .................... 709/206 |

OTHER PUBLICATIONS

Gravatar, "Gravatar—Globally Recognized Avatars," 13 pages, http://site.gravatar.com/ (accessed Mar. 14, 2007).
Gravatar, "Gravatar Blog," 6 pages, http://blog.gravatar.com (accessed Mar. 14, 2007).
Gravatar, "My Gravatars," 1 page, http://blog.gravatar.com/assets/2007/2/1/gravatar_screenshot_emails.png (accessed Mar. 14, 2007).
"Gravatar—Globally Recognized Avatars," Gravatar, printed on Mar. 14, 2007, 19 pgs., http://site.gravatar.com/.

* cited by examiner

*Primary Examiner*—Charles Rones
*Assistant Examiner*—Fazlul Quader
(74) *Attorney, Agent, or Firm*—Frommer Lawrence & Haug LLP; Scott M. Tobias

(57) ABSTRACT

Rendering a contributor representation, such as an avatar, near content such as a comment, contributed to a web page such as a blog. The contributor representation is associated with a contributor identifier, such as an email address, and stored at a centralized registrar. The centralized registrar provides a content service with an initial script to include in the web page along with the contributor identifier. A requesting client runs the initial script, which requests an additional script from the centralized registrar. The additional script can track user actions and analyzes the DOM of the web page for an attribute associated with the contributor identifier and contributed content. Based on a location of the attribute in the DOM, the additional script also determines a location in the web page to insert the contributor representation. The additional script then requests and inserts the contributor representation to be rendered near the contributed content.

20 Claims, 5 Drawing Sheets

COMMENT FACES

FIELD OF ART

The present invention relates generally to identifying contributors of content and, more particularly, but not exclusively to dynamically identifying a contributor of content by analyzing an object model of the content for contributed content and selectively inserting and displaying near the contributed content, a contributor representation, such as an avatar, to identify the contributor.

BACKGROUND

Often, electronic content, such as a web page, includes portions of content contributed by a number of authors. For example, web logs (blogs) and other collaborative content services, often enable users to submit comments or otherwise contribute content to the blog. A representation of a contributor is typically displayed near the contributed content. For instance, a user name, email address, or image may be displayed near contributed content, along with a date and time at which the content was contributed. The representation, or a link to the representation, is typically inserted into the web page by the content service prior to sending the web page to a visitor's client device. In some cases, a link to the representation is included in the web page and a client application, such as a browser, uses a plug-in module to accesses and render the representation from a source other than the content service. To view the representation, each visitor to the web page is required to install the plug-in module. Plug-in modules can create incompatibilities with upgraded applications, such as upgraded browsers, can create information security risks, and can complicate or prevent user support as the application provider and the plug-in provider blame each other for problems. It is with respect to these and other issues that the invention is directed.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

Figure 1:
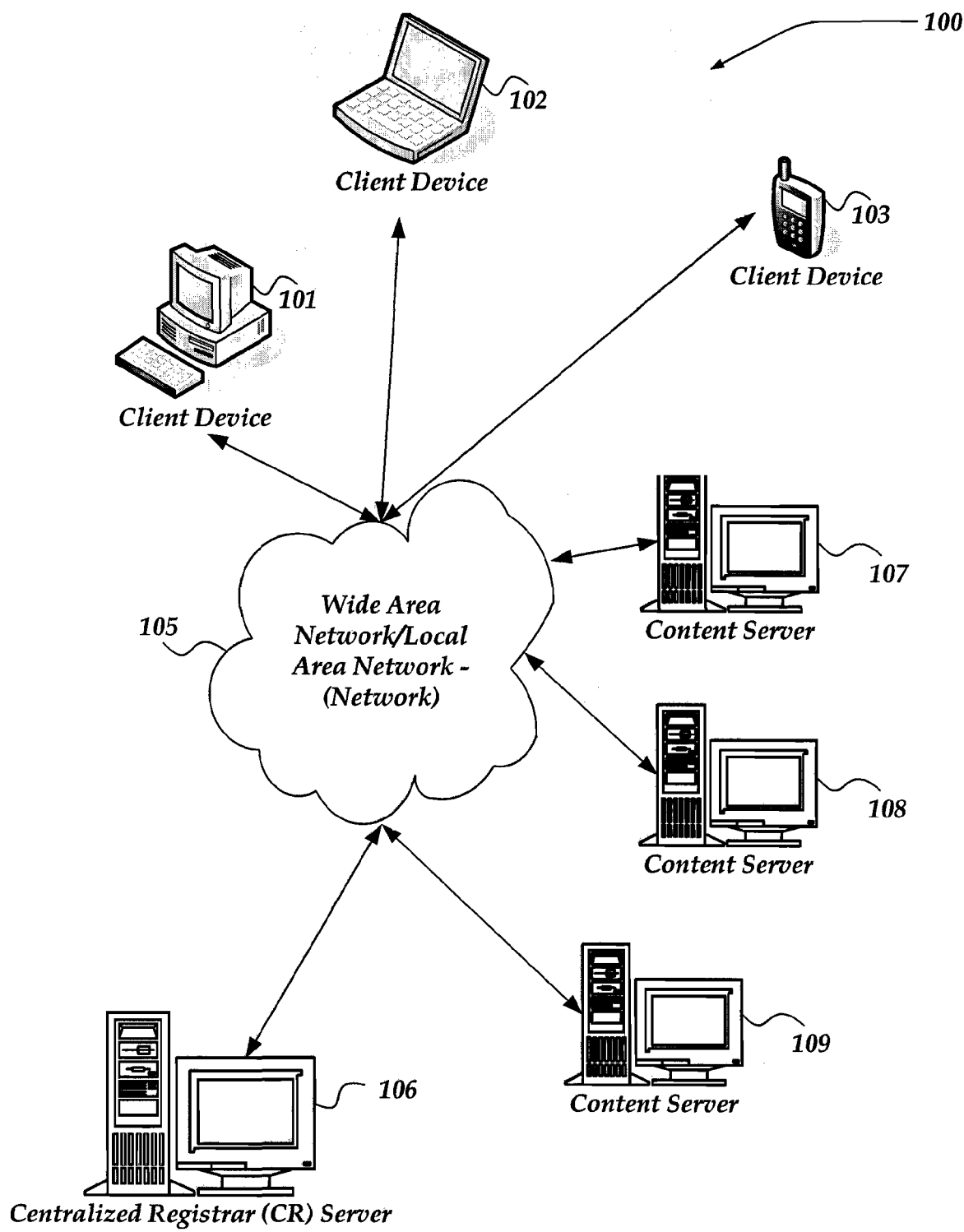
FIG. 1 is a system diagram of one embodiment of an environment in which the invention may be practiced.

The present invention now will be described more fully hereinafter with reference to the accompanying drawings, which form a part hereof, and which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the"include plural references. The meaning of "in" includes "in" and "on."

The term "distributed networking sites," refers to a plurality of networking sites, or similar networking sites, that are configured and arranged to receive visitor information distributed from a centralized data source. In a typical example, a plurality of websites may register to receive such visitor information. At least one of the plurality of networking sites is managed distinct from another one of the plurality.

The following briefly describes embodiments of the invention in order to provide a basic understanding of some aspects of the invention. This brief description is not intended as an extensive overview or to otherwise narrow the scope of the invention. Its purpose is merely to present some concepts in a simplified form.

Briefly stated, embodiments of the invention are directed towards identifying contributors to content. Content services may include, for example, a blog, a social networking website, or the like. Contributors register with a central registration service, which allows selective rendering of contributor avatars, audio, video, or other representations in any content service to which the contributors contribute. A processing module is delivered to a client along with content, so that a local client module need not be pre-installed. A centralized registration system is used to dynamically identify contributors to any content service that includes the processing module with its shared content. Contributors and visitors need not install a permanent module on their client. The embedded module inserts a contributor representation along with the contributed content on each visitor's client that requests the content.

A contributor or visitor may enter through the centralized registration system, selective personal information, including profile information such as a photograph, name, alias, address or the like; contact information, including, for example, email address, phone numbers, IM addresses, mailing address, or the like; information about social networking communities the visitor participates in; or the like. In one embodiment, the contributor or visitor may select what information is made available for display or other form of rendering to visitors. A contributor roll and/or reader roll may be employed to provide selective information about recent contributors or visitors to a blog, social networking website, or other content service. The present invention may selectively display recent contributor/visitor information for contributors/visitors that might not currently be accessing the content service. In another embodiment, at least one displayed contributor/visitor is currently accessing the content service. A contributor/visitor to a content service may select to not have their information displayed at a certain content service, while still being displayed at another content service. In one embodiment, selecting whether to display their information at one content service or not to display their information at another content service may be performed during registration, or at any later time. In one embodiment, selecting to not display their information may be performed by 'mousing' over their information within a displayed contributed content or a roll of contributors/vistors, and selecting a display option. Content services may then look to the centralized registration system to determine whether to display the contributor/visitor information, while still being able to obtain information about the contributor/visitor, and/or provide benefits to the contributor/visitor.

It should be noted however, that the invention is not constrained to merely displaying selective information for a contributor/visitor within the content of the content service. For example, at least some of a contributor's or visitor's information may also be displayed within a ratings form, an array of avatars of contributors/visitors, or the like. Moreover, it should be clear that virtually any contributor/visitor information provided within the central registration system may be used by one or more distributed content sources.

Illustrative Operating Environment

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 includes local area networks ("LANs")/wide area networks ("WANs")-(network) 105, Centralized Registrar (CR) server 106, client devices 101-103, and content servers 107-109.

Generally, client devices 101-103 may include virtually any computing device capable of connecting to another computing device to send and receive information, including web requests for information from a server, providing content, or the like. The set of such devices may include devices that typically connect using a wired communications medium such as personal computers, multiprocessor systems, microprocessor-based or programmable consumer electronics, network PCs, and the like. The set of such devices may also include devices that typically connect using a wireless communications medium such as cell phones, smart phones, radio frequency (RF) devices, infrared (IR) devices, integrated devices combining one or more of the preceding devices, or virtually any network device. Similarly, client devices 101-103 may be any device that is capable of connecting using a wired or wireless communication medium such as a PDA, POCKET PC, wearable computer, and any other device that is equipped to communicate over a wired and/or wireless communication medium.

Client devices 101-103 may include a client application that may be configured to provide information that identifies itself, including a type, capability, name, and the like. Client devices 101-103 may identify themselves through any of a variety of mechanisms, including a phone number, Mobile Identification Number (MIN), an electronic serial number (ESN), or a network address, such as an Internet Protocol (IP) address, or other network address identifier. In one embodiment, client devices 101-103 may be configured to provide such network address identifier in a message, or the like, sent over network 105 to another computing device. In one embodiment, at least some information about the client device may also be provided to another computing device, through a network cookie.

Client devices 101-103 may further include a client application that is configured to manage various actions. For example, client devices 101-103 may include a web browser application that is configured to enable an end-user to interact with other devices and/or applications over network 105. For example, client devices 101-103 may enable use of the web browser to access content, web pages, or the like, from another computing device, such as content servers 107-109, or the like. In one embodiment, client devices 101-103 may receive a network cookie from, and/or provide the network cookie to content servers 106-109, and/or CR server 106.

In addition, client devices 101-103 may employ a variety of other client applications to communicate with other devices over network 105, including, but not limited to Voice Over Internet Protocol (VOIP), Instant Messaging (IM), Short Message Service (SMS), Multimedia Message Service (MMS), email, or the like. Thus, client devices 101-103 may employ a variety of mechanisms to establish network sessions with another computing device.

Network 105 is configured to couple one computing device with another computing device to enable them to communication information. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may travel between one computing device and another computing device.

Additionally, communication media typically embodies computer-readable instructions, data structures, program modules, or other data that are communicated via a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as twisted pair, coaxial cable, fiber optics, wave guides, and other wired media and wireless media such as air or fluids that transmit acoustic, RF, infrared, and other wireless signals.

Figure 3:
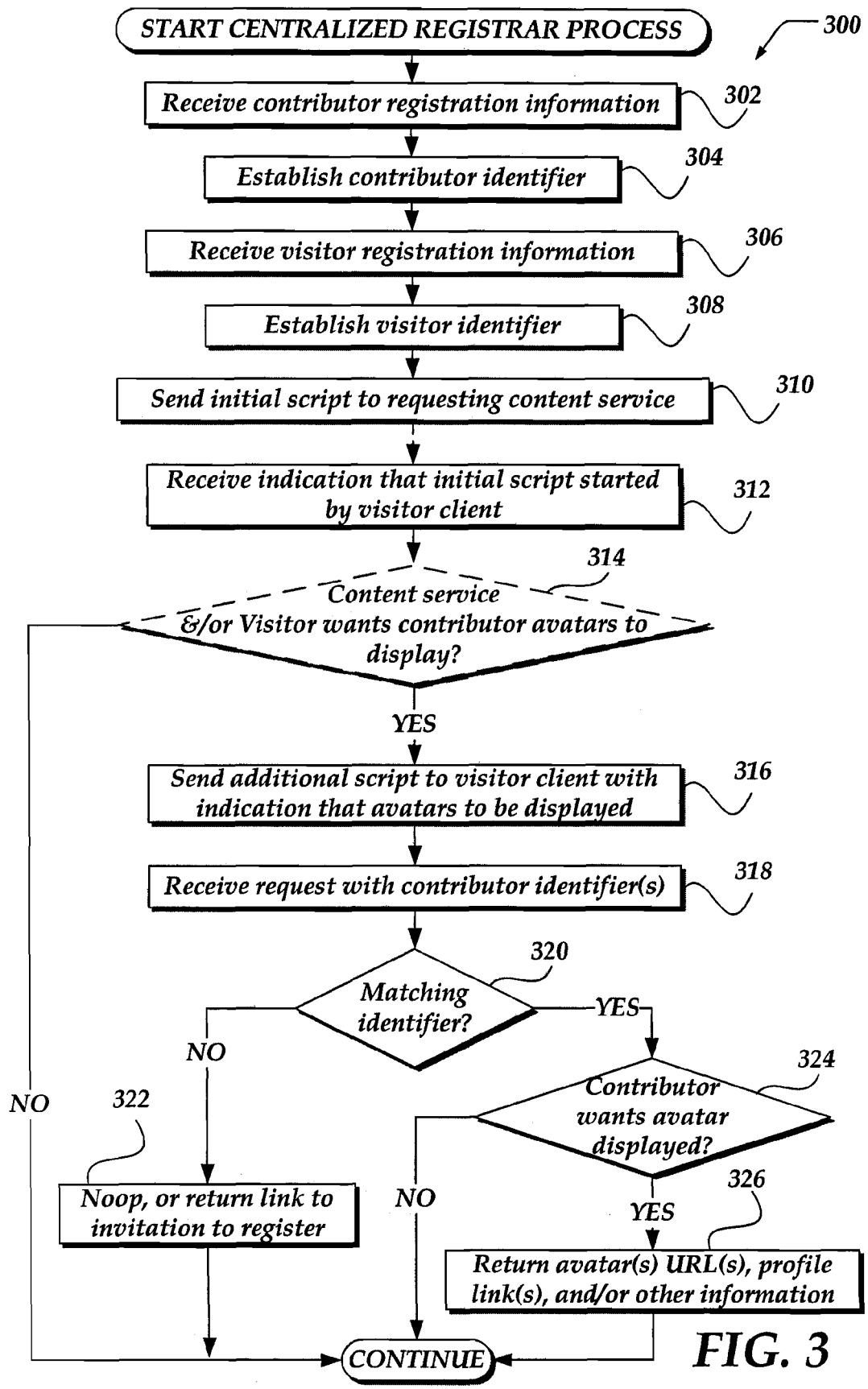
FIG. 3 illustrates a logical flow diagram generally showing one embodiment of a process by a centralized registrar for storing and distributing instructions and contributor representation data.

One embodiment of a network device configured to operate as a CR server or a distributed content server is described in more detail below in conjunction with FIG. 3. Briefly, however, content servers 107-109, may be configured to operate as website servers. However, content servers 107-109 are not limited to web servers, and may also operate a messaging server, a File Transfer Protocol (FTP) server, a database server, content server, and the like. Additionally, each of content servers 107-109 may be configured to perform a different operation. Thus, for example, content server 107 may be configured as a blog website, while content server 108 may be configured as music or video download server. Moreover, while content servers 107-109 may operate as other than a website, they may still be enabled to receive an HTTP communication. In one embodiment, content servers 107-109 may each operate a blog site, a social networking website, or the like. In any event, content servers 107-109 collectively represent one embodiment of a distributed content source, in that content, such as social networking content, may be distributed across a plurality of different servers.

In one embodiment, content servers 107-109 may be configured to provide visitor and/or contributor information such as an avatar indicating contributors. However, content servers 107-109 may also obtain and display information using any of a variety of other formats, structures, or the like. In one embodiment, a contributor may select to not have their avatar or other information displayed for one content server, while having their avatar and other information displayed for another content server.

In one embodiment, CR server 106 and/or content servers 107-109 may be configured to display a screen, menu, link, or the like, to enable a contributor to centrally register. In one embodiment, when a contributor selects to centrally register through a content server, the content server might redirect the contributor to CR server 106. Once centrally registered, each content server that subscribes to CR server 106's services may access and selectively display contributor information. One embodiment of a process for selectively displaying contributor information within a contributor section is described in more detail below. However, the invention is not constrained to displaying visitor information within a contributor section. For example, in one embodiment avatars, logos, photographs, links to contributors, or the like, may also be selectively displayed using any of a variety of formats, structures, or the like, including but not limited to lists, tables, frames, or the like.

Devices that may operate as CR server 106 or content servers 107-109 include personal computers desktop computers, multiprocessor systems, microprocessor-based or programmable consumer electronics, network PCs, servers, and the like.

One embodiment of CR server 106 is described in more detail below in conjunction with FIG. 2. Briefly, however, CR server 106 may include any computing device capable of connecting to network 105 to enable a contributor to a blog, social network website, or virtually any other website, to centrally register for display and/or use of their information at the website. In one embodiment, the website may be hosted by content servers 107-109. In one embodiment, the website may employ the contributor information to provide a benefit to the contributor or visitors, including, for example, a discount, access to selected additional information, coupons, videos, or the like. In one embodiment, the CR server 106 and content servers 107-109 may further employ the content information and/or visitor information to track the contributor's and/or visitors' access of information, and to display information about readers' responses to contributors' contributions to the website, or even another website.

CR server 106 may enable registration by a contributor or visitor, and manage a centralized data store for use by content servers 107-109, or other distributed content sources. In one embodiment, CR server 106 may provide a menu interface, a forms interface, window, or the like, to enable a contributor to enter personal information, including, but not limited to profile information such as an avatar, a logo, photograph, name, alias, address or the like; contact information, including, for example, email address, phone numbers, IM addresses, mailing address, or the like; information about blogs, social networking communities, or other services that the contributor participates in; or the like. The invention is not limited to this information, and other information may also be provided, without departing from the scope of the invention. For example, in one embodiment, the contributor may select which blogs, social network sites, or the like, that the contributor does/does not want their information to be displayed. In one embodiment, a registered contributor may receive a unique identifier that is useable at content servers 107-109. In one embodiment, the unique identifier may be provided within a cookie. However, the unique identifier may also be provided using any of a variety of other mechanisms. In one embodiment, the unique identifier may be created based on a timestamp, or the like. In one embodiment, the unique identifier may be encrypted.

When a registered contributor contributes to one of content servers 107-109, the contributor may provide the unique identifier to the content server. The content server may then provide the unique identifier to CR server 106. CR server 106 may perform a search using the unique identifier. If a match is found, CR server 106 may provide information about the contributor to the content server, where the content server may selectively include at least some of the information about the contributor in web pages or other content to which the contributor contributed, and/or employ the information for any of variety of other usages. One embodiment of a process useable for central registration is described in more detail below in conjunction with FIG. 4.

Although FIG. 1 illustrates CR server 106 as a single computing device, the invention is not so limited. For example, one or more functions of CR server 106 may be distributed across one or more distinct computing devices.

Illustrative Centralized Registrar Environment

Figure 2:
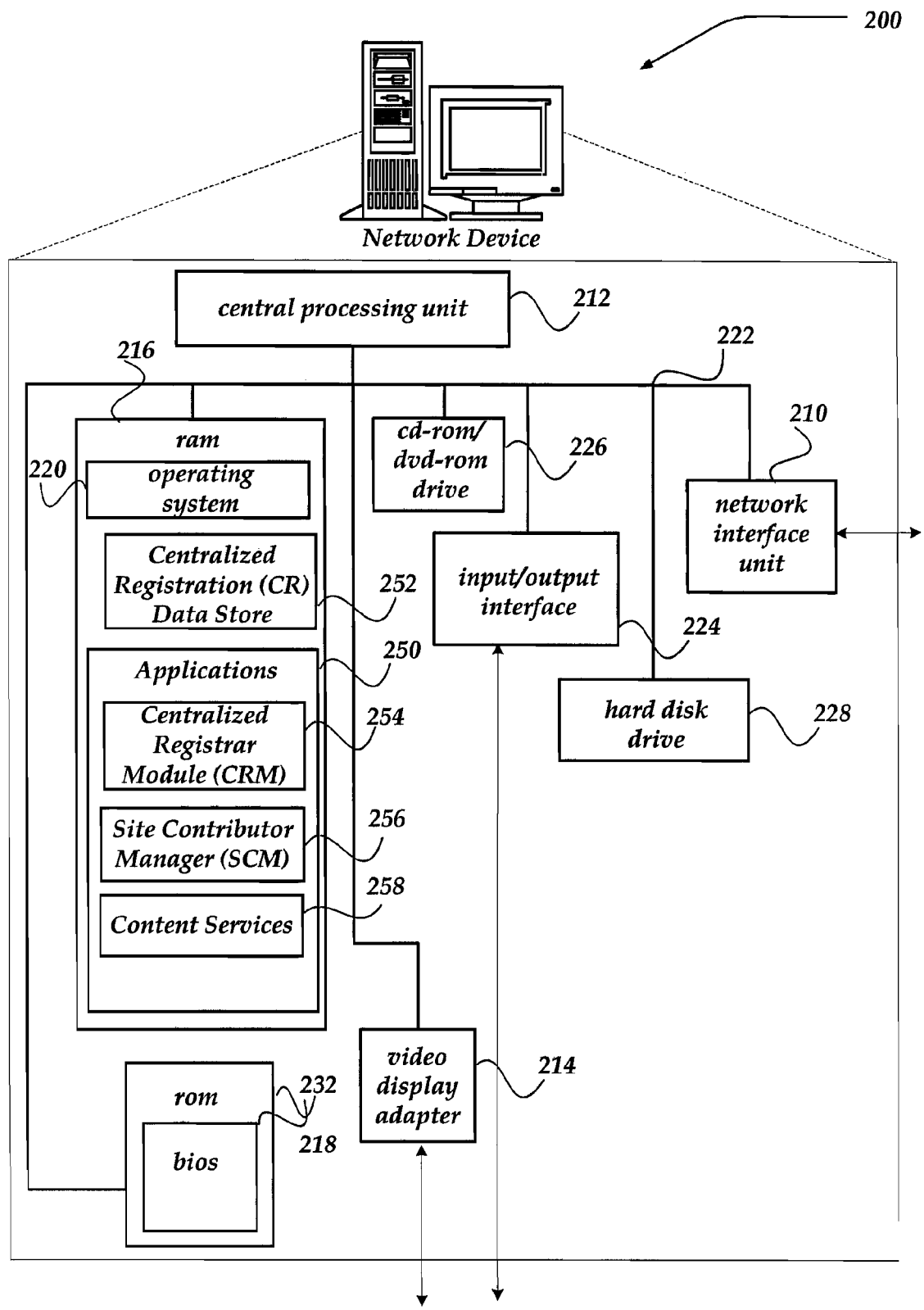
FIG. 2 shows one embodiment of a network device, according to one embodiment of the invention.

FIG. 2 shows one embodiment of a network device, according to one embodiment of the invention. Network device 200 may include many more components than those shown. The components shown, however, are sufficient to disclose an illustrative embodiment for practicing the invention. Network device 200 may represent, for example, CR server 106 and/or content servers 107-109 of FIG. 1. Client devices 101-103 may also be configured similar to network device 200.

Network device 200 includes processing unit 212, video display adapter 214, and a mass memory, all in communication with each other via bus 222. The mass memory generally includes RAM 216, ROM 232, and one or more permanent mass storage devices, such as hard disk drive 228, tape drive, optical drive, and/or floppy disk drive. The mass memory stores operating system 220 for controlling the operation of network device 200. Any general-purpose operating system may be employed. Basic input/output system ("BIOS") 218 is also provided for controlling the low-level operation of network device 200. As illustrated in FIG. 2, network device 200 also can communicate with the Internet, or some other communications network, via network interface unit 210, which is constructed for use with various communication protocols including the TCP/IP protocol. Network interface unit 210 is sometimes known as a transceiver, transceiving device, or network interface card (NIC).

The mass memory as described above illustrates another type of computer-readable media, namely computer storage media. Computer storage media may include volatile, non-volatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more applications 250 are loaded into mass memory and run on operating system 220. Examples of application programs may include transcoders, schedulers, calendars, database programs, word processing programs, HTTP programs, customizable user interface programs, IPSec applications, encryption programs, security programs, VPN programs, SMS message servers, IM message servers, email servers, account management, web servers, and so forth. Mass memory also includes centralized registrar (CR) data store 252. Applications 250 also include Centralized Registrar Module (CRM) 256.

CR data store 252 is configured and arranged to receive and manage centralized registrations for use by any of a variety of contributors, distributed content servers, clients, or the like, that request access to registered contributor or visitor information. CR data store 252 may include any of a variety of information related with the registered, including, but not limited to an avatar or other image, an email address, a phone number, an alias, a name, a birth date, a gender, an address, various other account addresses including but not limited to IM, ICQ accounts, or the like. CR data store 252 may also include information about user names associated with a contributor or visitor for various blogs, social networking communities, or the like. CR data store 252 may further include information about visitor preferences, including which blogs, social networking sites, or other content providers the contributor or visitor has selected not to have their information displayed, or the like. CR data store 252 may be implemented as a data base, a folder, a script, a program, or the like. Moreover, CR data store 252 may also be configured and arranged to reside within hard disk drive 228, cd-rom/dvd-rom drive 226, a removable storage device, or any of a variety of other storage mediums.

CRR 254 is configured and arranged to manage centralized registrations for contributor or visitors to various content servers, such as content servers 107-109 of FIG. 1. CRR 254 may receive a request for registration from a contributor or visitor to a content server. In one embodiment, a content server may redirect the contributor or visitor to CRR 254 to perform centralized registration. CRR 254 may provide a user interface that may include forms, menus, selectable icons, links, or the like, configured to receive contributor or visitor registration information. In one embodiment, the contributor or visitor may provide avatars, logos, photographs, links, or the like, as part of the registration process. In one embodiment, the contributor or visitor need not provide a complete set of registration information, and a minimum set of information might be provided. Moreover, the contributor or visitor may also modify information provided during an initial centralized registration, or even at a subsequent time. The contributor or visitor may also un-register from the centralized registration system of CRR 254.

When a contributor or visitor has initially registered, CRR 254 may provide the contributor or visitor with a unique identifier, useable for enabling selective display of at least some of the visitor's information. In one embodiment, the unique identifier is a sequence of digits, which may include, at least in part, a timestamp. However, the unique identifier is not constrained to including timestamps, and virtually any other data may be employed to generate the unique identifier, including but not limited to at least some of the information provided by the contributor or visitor during registration, or a combination of such information. In one embodiment, the unique identifier is encrypted. In one embodiment, the unique identifier may be provided to the contributor or visitor in a network cookie. However, the invention is not so limited, and the unique identifier may be provided using any of a variety of other mechanisms. In another embodiment, the unique identifier may be the contributor's or visitor's email address.

CRR 254 may be further configured to receive the unique identifier from a content server or client. CRR 254 may perform a search with CR data store 252 for a match on the unique identifier. If a match is found, CRR 254 may then provide the content server or client with the registered contributor or visitor information. In one embodiment, CRR 254 may also provide an indicator identifying whether the contributor or visitor has requested that their information not be displayed by the requesting content server or client. CRR 254 may, in one embodiment, employ a process such as described below to perform at least some of its actions.

If network device 200 is a content server, or the content server is combined with the CR server, applications 250 may also include Content Services 258 and Site Contributor Manager (SCM) 256. Content services 258 may represent any of a variety of applications, scripts, applets, webpages, or the like, configured to provide content to a visitor. As such, in one embodiment, content services 258 may represent a web server that is configured to provide webpages, forms, scripts, or the like, for viewing by a visitor. In one embodiment, content services 258 may provide a weblog (blog) service to the visitor. In one embodiment, content services 258 may be configured to enable the visitor become a contributor by providing inputs, comments, messages, content, or the like, to other visitors to network device 200. Content services 258 is not limited to blogs, however, and virtually any networking service may be provided, including a photo service, a music service, a video service, a messaging service, a dating service, or the like. Moreover, content services 258 may also include a shopping service, or the like.

SCM 256 is configured and arranged to receive from a contributor or visitor of content services 258 a unique identifier, and to employ the unique identifier to selectively display contributor or visitor information with other content provided by content services. SCM 256 may selectively display contributor or visitor information, including, but not limited to avatars, email addresses, hyperlinks, or the like. In one embodiment, contributor information, such as an avatar, is a displayed next to or near content contributed by the contributor. Contributor and/or visitor information may also be displayed in a visitor roll or other aspect of the content services, but should not be construed as a limitation to the invention, and is merely one embodiment of an example mechanism for selectively displaying contributor or visitor information.

SCM 256 may employ the unique identifier to search the CR data store, or to request another application or the like, to search the CR data store for a match. In one embodiment, SCM 256 may also be configured to enable a display of a link, or the like, that enables a visitor sans a unique identifier to centrally register and obtain a unique identifier.

SCM 256 may also obtain a list of recent contributors or visitors from CR data store 252 and selectively display the information within a webpage provided by content services 258. In one embodiment information about recent contributors or visitors may be displayed in chronological order. In one embodiment, the recent contributor/visitor information may be truncated after a defined number of recent contributor/visitors, displayable contributor/visitors, or the like. SCM 256 may employ, at least in part, a process such as described below to perform at least some of its actions.

Generalized Operation

The operation of certain aspects of the invention will now be described with respect to FIGS. 3-5. FIG. 3 illustrates a logical flow diagram generally showing one embodiment of a process by a centralized registrar for storing and distributing instructions and contributor representation data, such as an avatar, a video clip, an audio clip, a logo, a link to the contributor's website, an alias name, or the like. Process 300 of FIG. 3 may, for example, be implemented in part within CR server 106 of FIG. 1. In addition, or alternatively, some or all of process 300 may be implemented with content services 107-109 of FIG. 1.

Process 300 may begin, after a start block, at an operation 302 where the centralized registrar receives a request from a contributor to register, and receives contributor registration information. The contributor registration information includes contributor representation data, such as an avatar, other profile data, and a contributor identifier. Profile data may include name, email address, a link to the contributor's web site, descriptions of products or services offered by the contributor, preference settings, or the like. Preference settings may indicate whether the contributor wants contributor representation data provided to clients, web site identifiers to indicate those web sites to which the contributor wants contributor representation data provided, blacklisted web site identifiers to indicate those web sites to which the contributor does not want contributor representation data provided, a list of web site identifiers and corresponding contributor representation identifiers to enable different avatars to be displayed for different web sites, client device identifiers for one or more client devices to which the contributor wants information sent, or the like. At an operation 304, the centralized registrar establishes a contributor identifier, which may comprise one or more portions of the contributor registration information, or may be a unique identifier such as a hash value. In a simple example, the contributor identifier may be the contributor's e-mail address. The centralized registrar stores an association between the contributor identifier and the contributor registration information, including the contributor representation data.

Similarly, at an operation 306, the centralized registrar receives visitor registration information, such as a visitor e-mail address and a preference on whether to display contributor avatars on web pages requested by that visitor. A visitor identifier is also established from the visitor registration information or created by the centralized registrar, at an operation 308. Visitor registration information and contributor registration information can be obtained in any order.

At an operation 310, the centralized registrar sends an initial script to a requesting content service. In one embodiment, the initial script is a small amount of instruction code for the content service to insert into content web pages that will be served by the content service to clients of visitors to the content service's web site. The content services may permanently include the initial script and web pages or may insert the initial script as a web page is dynamically generated. The initial script will generally cost visitor client devices to request an additional script from the centralized registrar. The additional script will provide instructions for obtaining and displaying avatars, or rendering other contributor representation data, and provide instructions for tracking visitor behaviors or for other operations.

At some later time associated with operation 312, the centralized registrar receives a request or other indication that the initial script was started by of visitor client. For example, a visitor client may have requested a web page, such as a blog web page, from a content service, such as a blog. The visitor client would execute the initial script, and send an indication to the centralized registrar. The indication from the client may be, or include, the visitor identifier.

At an optional operation 314, the centralized registrar may determine whether the content service that provided the web page, and/or the individual visitor has indicated whether contributor avatars or other contributor representations should be displayed with contributed content on the web page. If only the content service is allowed to indicate this preference, an indicator may be permanently embedded in the initial script or in an additional script discussed below. If the content service or visitor can control display of the contributor avatars, and the content service or visitor has indicated a preference or instruction not to include contributor avatars, the centralized registrar may take no further action with regard to contributor representations.

However, if the content service or visitor cannot control display of the contributor avatars, or the content service or visitor has indicated a preference or instruction to include contributor avatars, the centralized registrar communicates an additional script to the visitor client, at an operation 316. The centralized registrar also communicates an indication that avatars or other contributor representations are to be displayed. The additional script provides instructions to the visitor client for identifying a contributor and a location of contributed content in the web page. The additional script may be, or may be a portion of, a tracking script, which tracks visitor actions on the visitor client or other visitor behaviors.

At an operation 318, the centralized registrar receives a request from the visitor client for one or more contributor representations. The request includes one or more corresponding contributor identifiers that were determined from the web page. At a decision operation 320, the generalized registrar determines whether a received contributor identifier match is one of the stored contributor identifiers. If a match is not found, the centralized registrar may perform no operation or communicate an invitation link to the content service or directly to a contributor with an invitation for the contributor to register with the centralized registrar, at an operation 322. For example, if the web page includes contributor e-mail addresses as contributor identifiers, the centralized registrar may send an invitation directly to the non-matching contributor email address, or to the web page content service for relay to the contributor.

Conversely, if a match is found, the centralized registrar may determine at a decision operation 324, whether the contributor has set a preference that an avatar or other contributor representation be provided to visitor clients that display the web page with the contributed content. As described above, the contributor may set the preference during registration, or edit the preference at another time. If the preference is not set, though centralized registrar may continue and other operations without returning an avatar or other contributor representation. Conversely, if the preference is set, the centralized registrar returns one or more avatars, URLs, links to contributor profile(s), or other information, at an operation 326.

Figure 4:
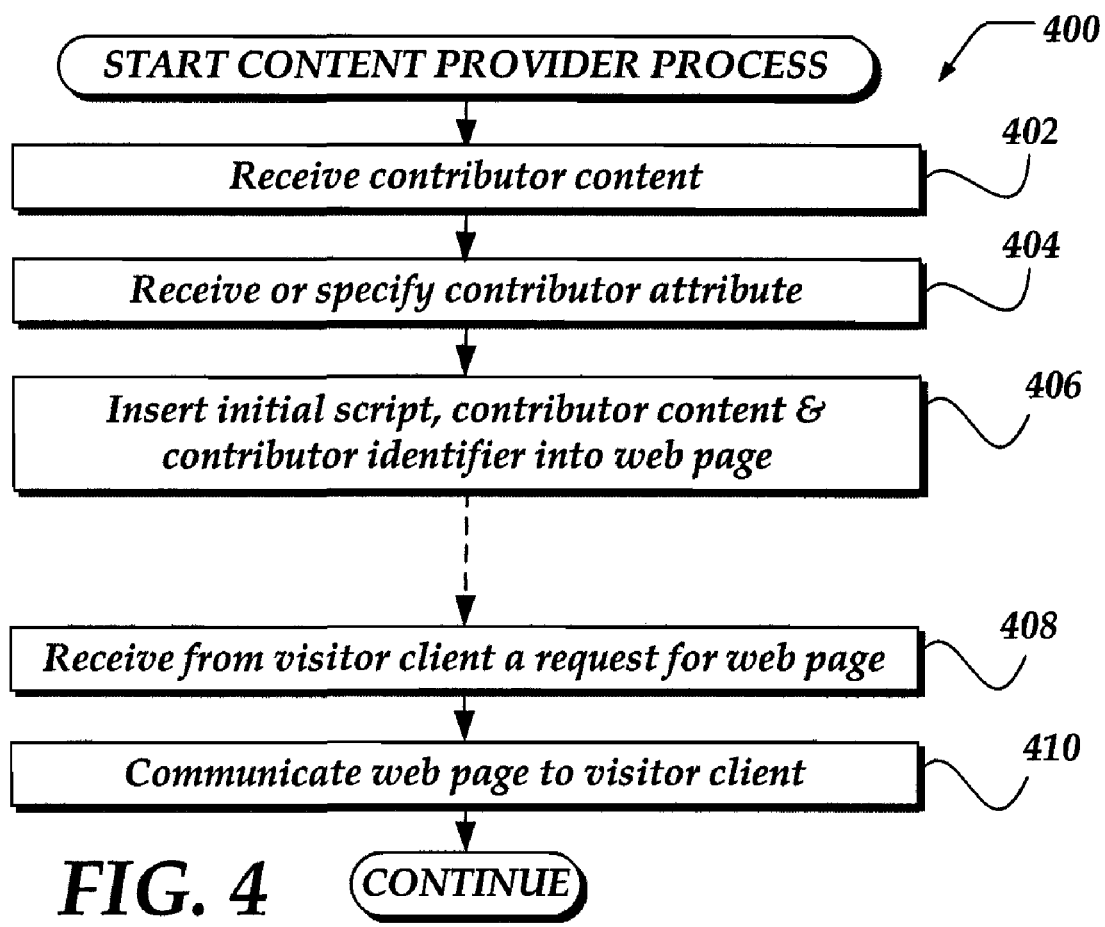
FIG. 4 illustrates a logical flow diagram generally showing one embodiment of a process by a content service for processing contributed content.

FIG. 4 illustrates a logical flow diagram generally showing one embodiment of a process by a content service for processing contributed content. At an operation 402, the content service receives contributor content, such as a comment for a blog. The content service also generally receives a contributor identifier, such as an e-mail address, and instant messaging address, a user name, an alias, a web site address, a TypeKey ID, or the like. The contributor identifier may specify or indicate a contributor attribute at an operation and 404, such as a data type of the contributor identifier. Alternatively, the content service may specify a content attribute to be used in web pages to indicate contributed content.

At an operation 406, the content service receives the initial script from the generalized registrar, and inserts the initial script into one or more web pages that the content service will provide to visitors. The content service also inserts one or more items of contributor content and one or more corresponding contributor identifiers into the web page. The contributor identifier may comprise the contributor content itself, such that the generalized registrar searches for the same content to determine a corresponding avatar. In this case, the content service may send the contributor content to the centralized registrar to store for later matching. If a contributor does not provide a contributor identifier, or the content service cannot obtain a contributor identifier from the centralized registrar, the content service may redirect the contributor to the centralized registrar for registration. The content service may insert the initial script contributor content and contributor identifiers while dynamically generating a web page to provide to visitors.

At some later time, the content service receives a request for a web page or other content from of visitor client, at an operation 408. The content service accesses or generates the requested web page, and communicates the web page to the visitor client at an operation 410.

Figure 5:
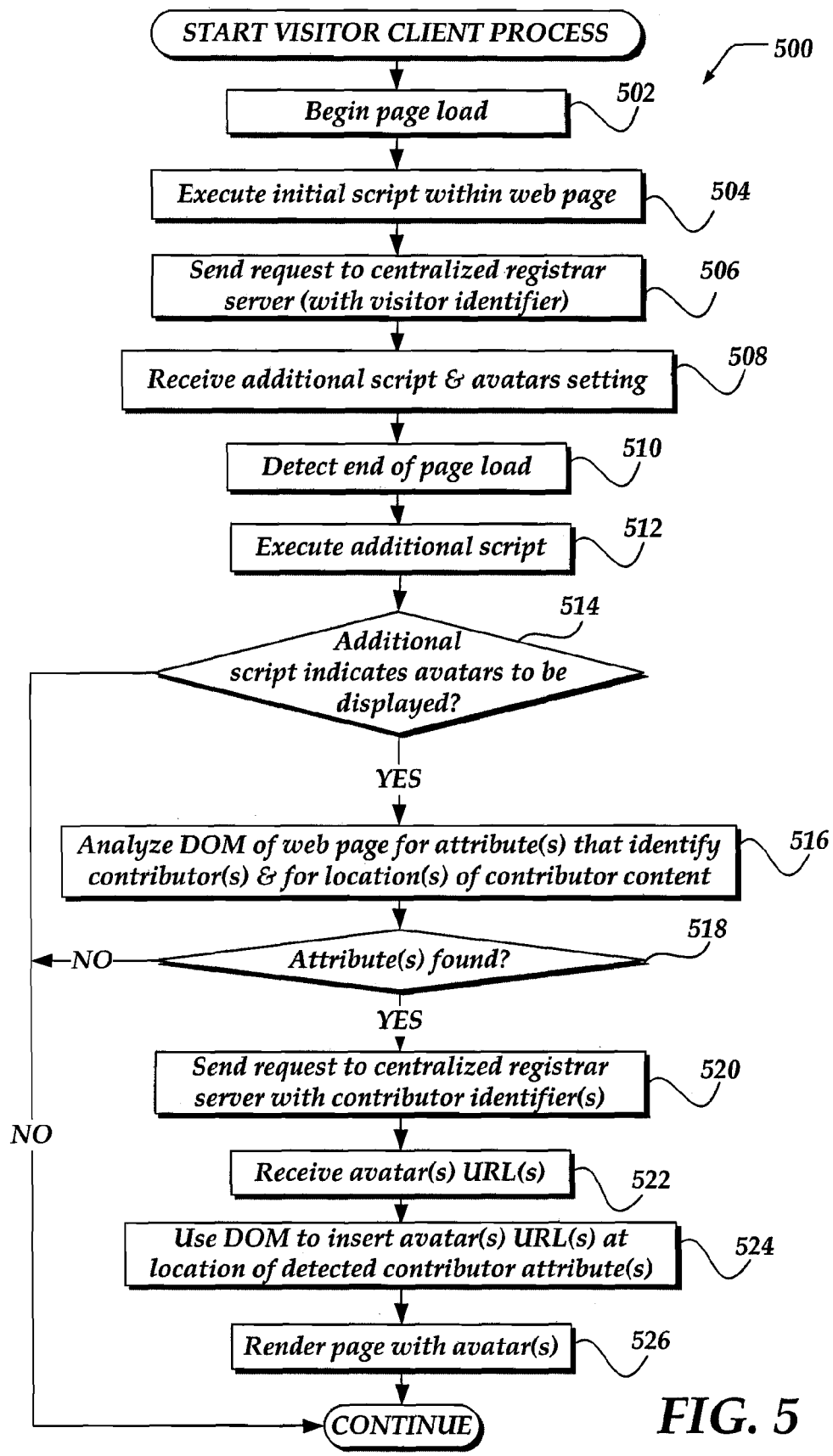
FIG. 5 illustrates a logical flow diagram generally showing one embodiment of a process by a visitor client for accessing and rendering a contributor representation near each contributed content in a web document.

FIG. 5 illustrates a logical flow diagram generally showing one embodiment of a process by a visitor client for accessing and rendering an avatar and/or other contributor representation(s) near each contributed content item on the web page. After the visitor client browser requests the web page from the content service, the visitor client begins to load the web page at an operation 502. When the visitor client encounters the initial script within the web page, the visitor client executes that initial script at an operation 504. The initial script instructs the visitor client to send a request to the centralized registrar at an operation 506 for information and services provided by the centralized registrar. The initial script may also send visitor identifier(s), such as a visitor user ID, a visitor e-mail address, a visitor device identification number, and/or the like.

At an operation 508, the visitor client receives an additional script from the central registrar. The additional script generally provides instructions to the visitor client for accessing and inserting contributor representations into the web page. The additional script may sometimes be referred to as a tracking script, because the additional script may also track visitor actions and communicates visitor behavior information to the central registrar, the content service, and advertising service, or other service that uses tract information. Included within the additional script, or along with the additional script, the visitor client also receives contributor representation settings, such as contributor preference settings, visitor preference settings, and/or content service preference settings. The preference settings include a setting as to whether or contributor avatars or other contributor representations should be rendered.

At an operation 510, the visitor client detects that the web page has been completely loaded into memory and is available for rendering, such as by a browser. The visitor client begins executing the additional script at an operation 512. At a decision operation 514, the additional script may check settings provided with the additional script, to determine whether the content service or visitor indicated that contributor representations may be rendered with the web page. For example, the additional script may indicate that the content service has enabled avatars and/or other contributor representations to be rendered. Similarly, the additional script may include visitor registration information that indicates the visitor has enabled avatars and/or other contributor representations to be rendered. The additional script also specifies which type of contributor attribute for which the additional script should search in the web page. As examples, the additional script may specify that it should search for e-mail addresses, URLs, TypeKey IDs, the content marked as contributor content, or the like.

If the additional script indicates that avatars or other contributor representations are not enabled, the additional script may end processing for contributor representations, but may continue on with its tracking or other operations. If contributor representations are enabled, the additional script analyzes the document object model (DOM) of the web page at an operation 516. The additional script traverses the nodes of the DOM, and searches for attributes that identify contributors. If a contributor attribute is found, the additional script notes the node location of the contributor attribute within the DOM. The additional script may also search for content that is identified as contributor content. The contributor content may be tagged as such, may be at or within a certain node level or location relative to the contributor attribute node, or may otherwise be determinable from the DOM.

If, at a decision operation 518, no contributor attributes are found, the additional script may end processing for contributor representations, but may continue on with its tracking or other operations. However, if a contributor attribute is found, the additional script determines a contributor identifier based on the contributor attribute. The contributor identifier may be the contributor attribute itself. Alternatively, the contributor identifier may be the contributed content itself. In yet another alternative, the contributor identifier may be unique identifier that is generated from or associated with the contributor attribute. For example, the contributor identifier may be a hash value generated from characters of the contributors e-mail address or other contributor attribute. The additional script may obtain the contributor identifier from a remote source based on the contributor attribute. At an operation 520, the additional script sends a request to the centralized registrar with the contributor identifier or the contributor attribute from which the contributor identifier can be determined.

The additional script may wait for a predefined time, or may wait for any extended time to receive contributor representation data, at an operation 522. The contributor representation data may be an avatar, a logo, a photo image, of video clip, and audio clip, a contributor's web site address, or the like. In one embodiment, the additional script receives a URL directed to avatar image data. At an operation 524, the additional script traverses the DOM to a node location relative to the contributor attribute node and or contributor content node. The additional script then inserts a node for the contributor representation data, such that the corresponding contributor representation will be rendered with the web page in a way that a human would perceive that the contributor representation is associated with the contributor content. At an operation 526, the additional script indicates that the visitor client may render the web page with the inserted avatar or other contributor representation.

The above specification, examples, and data provide a complete description of the manufacture and use of the composition of the invention. Since many embodiments of the invention can be made without departing from the spirit and scope of the invention, the invention resides in the claims hereinafter appended.

The invention claimed is:

1. A method for adding data to a web document, comprising:
   receiving a web document provided by a content service that includes contributor content, which was provided to the web document by a contributor, wherein the web document includes a contributor attribute that indicates a contributor identifier of the contributor content and indicates a location of the contributor content within the web document;
   searching a document object model (DOM) of the web document for the contributor attribute to determine the contributor identifier and to determine a contributor attribute location within the web document;
   communicating the contributor identifier in a request for contributor information to a centralized registrar of contributors, wherein the contributor information includes information about the contributor;
   receiving contributor representation data, which when rendered, provides a representation of the contributor;
   inserting the contributor representation data into the web document based on the contributor attribute location and based on an indicated preference of the content service, such that the contributor representation data is associated with the contributor content when the web document is rendered with the contributor representation data; and
   rendering the web document with the contributor representation data.

2. The method of claim 1, further comprising:
   executing an initial instruction in the web document to request additional processing instructions from a remote network node;
   receiving the additional processing instructions, which specify the contributor attribute for which to search in the web document, and which specify instructions for the searching, communicating, and inserting operations; and
   detecting that the web document has completed loading before executing the additional processing instructions.

3. The method of claim 1, wherein inserting the contributor representation data comprises:
   traversing the DOM to the contributor attribute; and
   inserting a contributor representation uniform resource locator (URL) as a node in the DOM, wherein the contributor representation URL specifies a network address at which the contributor resource data is stored.

4. The method of claim 1, further comprising:
   receiving a link to a contributor profile along with the contributor representation data; and
   inserting the link into the web document based on the contributor attribute location.

5. The method of claim 1, wherein the contributor attribute comprises one of the following: a name, a messaging address, a TypeKey ID, a website address, and the contributor content.

6. The method of claim 1, wherein the contributor representation comprises at least one of the following: an image, a video clip, an audio clip, and a link.

7. The method of claim 1, wherein the contributor content comprises a comment entry in a blog.

8. The method of claim 1, further comprising, prior to searching, receiving an indication that a visitor that requested the web document wishes to include the contributor representation in the web document.

9. The method of claim 1, wherein the web document is received via an electronic network from a content service and the contributor representation data is received from the centralized registrar.

10. A machine readable medium storing machine executable instructions that cause a machine to perform the operations of claim 1.

11. A client device to add data to a web document, comprising:
   a transceiver to send and receive data over a network;
   an output device to output a rendering of a web document; and
   a processor in communication with the transceiver and with the output device, wherein the processor is operative to perform actions, including:
      receiving a web document provided by a content service that includes contributor content, which was provided to the web document by a contributor, wherein the web document includes a contributor attribute that indicates a contributor identifier of the contributor content and indicates a location of the contributor content within the web document;
      searching a document object model (DOM) of the web document for the contributor attribute to determine the contributor identifier and to determine a contributor attribute location within the web document;
      communicating the contributor identifier in a request for contributor information to a centralized registrar of contributors, wherein the contributor information includes information about the contributor;
      receiving contributor representation data, which when rendered, provides a representation of the contributor;
      inserting the contributor representation data into the web document based on the contributor attribute location and based on an indicated preference of the content service, such that the contributor representation data is associated with the contributor content when the web document is rendered with the contributor representation data; and
      rendering the web document with the contributor representation data.

12. The client device of claim 11, further comprising an input device, and wherein the actions further include:

receiving a selection input indicating that the contributor representation data should be rendered; and determining that the selection input was received prior to inserting the contributor representation data.

13. A network device to add data to a web document, comprising:

a transceiver to send and receive data over a network; and a processor in communication with the transceiver, wherein the processor is operative to perform processor actions, including:

associating a contributor identifier with contributor information including contributor representation data, which when rendered, provides a representation of a contributor of contributor content to a web document provided by a content service, wherein the web document includes a contributor attribute that indicates a contributor identifier of the contributor content and indicates a location of the contributor content within the web document;

receiving from a client a request for at least a portion of the contributor information, wherein the request includes the contributor identifier; and communicating to the client, the contributor representation data along with rendering instructions for the client to perform a plurality of client operations including:

evaluating a document object model (DOM) of the web document to determine an attribute node within the DOM corresponding to the contributor attribute that indicates the contributor identifier; and inserting the contributor representation data into the web document at a location based on the attribute node and based on an indicated preference of the content service, such that the contributor representation data is associated with the contributor content when the web document is rendered with the contributor representation data.

14. The network device of claim 13, wherein the processor is further operative to perform further processor actions including:

providing initial instructions to a content service for inclusion in the web document to be accessed by the client, wherein the initial instructions instruct the client to perform further client operations prior to the operation of evaluating, wherein the further client operations include:

searching the DOM of the web document for the contributor attribute to determine the contributor identifier and to determine the attribute node; and communicating the contributor identifier in a request for contributor information to the network device.

15. The network device of claim 13, wherein the processor is further operative to perform further processor actions prior to the processor action of receiving from the client the request, wherein the further processor actions include:

receiving from the client a visitor identifier;

determining based on the visitor identifier that the client operations should be performed by the client; and setting a flag in the rendering instructions to indicate that the client operations should be performed.

16. The network device of claim 13, wherein the processor is further operative to perform further processor actions, including:

communicating to the client, a link to a contributor profile along with further rendering instructions for the client to perform further client operations of inserting the link into the web document at a location based on the attribute node, such that the link is humanly perceivable as being associated with the contributor content when the web document is rendered with the link.

17. A system for adding data to a web document, comprising:

a content service storing a web document that includes contributor content, a contributor attribute associated with a contributor identifier that identifies a contributor of the contributor content, and initial instructions for requesting at least a portion of contributor information;

a centralized registrar in communication with the content service through an electronic network and storing the contributor information, which is associated with the contributor identifier and which includes contributor representation data, which when rendered, provides a representation of the contributor of the contributor content; and a client in communication with the content service and with the centralized registrar through the electronic network, wherein the client is operative to perform a plurality of client operations, including:

receiving from the content service, the web document;

searching a document object model (DOM) of the web document for the contributor attribute to determine the contributor identifier and to determine a contributor attribute location within the web document;

communicating to the centralized registrar, the contributor identifier in a request for at least a portion of the contributor information;

receiving from the centralized register, the contributor representation data;

inserting the contributor representation data into the web document based on the contributor attribute location and based on an indicated preference of the content service, such that the contributor representation data is associated with the contributor content when the web document is rendered with the contributor representation data; and rendering the web document with the contributor representation data.

18. The system of claim 17, wherein the client is further operative to perform further client operations, including:

receiving a selection input indicating that the contributor representation data should be rendered; and determining that the selection input was received prior to inserting the contributor representation data.

19. The system of claim 17, wherein the client is further operative to perform further client operations, including:

receiving a link to a contributor profile along with the contributor representation data; and inserting the link into the web document based on the contributor attribute location.

20. The system of claim 17, wherein the contributor representation comprises at least one of the following: an image, a video clip, an audio clip, and a link.

* * * * *